United States Patent [19]

Isojima et al.

[11] 3,926,290

[45] Dec. 16, 1975

[54] LOADING CHUTE FOR CARGO VESSEL

[75] Inventors: Imao Isojima; Yuzuru Doi; Shinji Hara, all of Tamanoshi, Japan

[73] Assignees: Mitsui Shipbuilding & Engineering Co. Ltd., Tokyo; Kawasaki Steel Corporation, Kobe, both of Japan

[22] Filed: Feb. 27, 1975

[21] Appl. No.: 553,691

[30] Foreign Application Priority Data

Mar. 4, 1974 Japan................................. 49-25045
Mar. 4, 1974 Japan................................. 49-25046

[52] U.S. Cl. ...................... 193/27; 193/30; 193/3; 214/14

[51] Int. Cl.².................... B65G 11/08; B65G 11/14

[58] Field of Search ............... 193/3, 30, 14, 27, 29; 214/14, 15

[56] References Cited
UNITED STATES PATENTS

| | | | |
|---|---|---|---|
| 726,685 | 4/1903 | Holbrook.......................... | 193/30 X |
| 997,276 | 7/1911 | Curtis .................... | 193/27 |
| 1,021,757 | 4/1912 | Blaisdell............................ | 193/30 |
| 1,055,311 | 3/1913 | Blount .............. | 193/30 X |
| 1,126,418 | 1/1915 | Dodge..................... | 193/3 |
| 1,230,820 | 6/1917 | Levalley et al. ................. | 193/30 X |
| 1,951,703 | 3/1934 | Morison et al......................... | 193/3 |

FOREIGN PATENTS OR APPLICATIONS

| | | | |
|---|---|---|---|
| 307,641 | 3/1929 | United Kingdom................... | 193/27 |
| 1,290,875 | 3/1969 | Germany ............................. | 214/14 |

*Primary Examiner*—Evon C. Blunk
*Assistant Examiner*—James L. Rowland
*Attorney, Agent, or Firm*—Dorfman, Herrell and Skillman

[57] ABSTRACT

Loading chute for cargo vessel comprising a telescopical duct which comprises a plurality of unit ducts of successively enlarged horizontal cross sections, the uppermost duct being provided with trays which are fixed in the duct so as to form a zigzag ladder structure therein, each of second and other lower ducts being respectively provided with trays which are suspended by rope means from the adjacent upper duct so as to form a zigzag ladder structure, whereby when ducts are telescopically retracted, trays are rotated to the vertical position.

3 Claims, 13 Drawing Figures

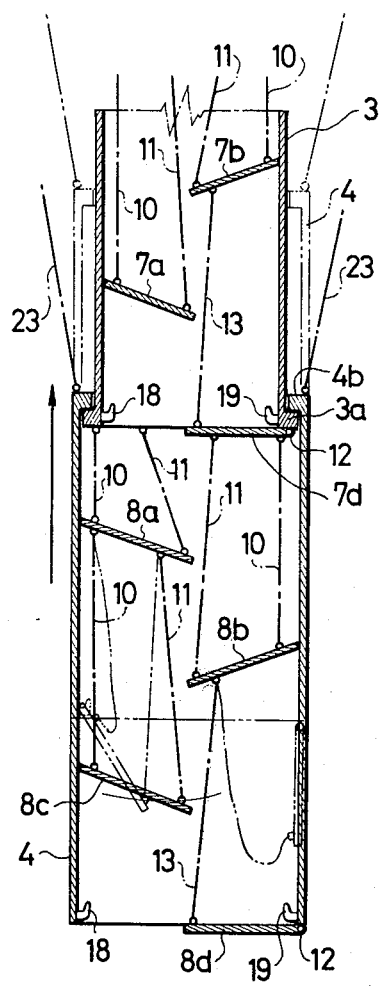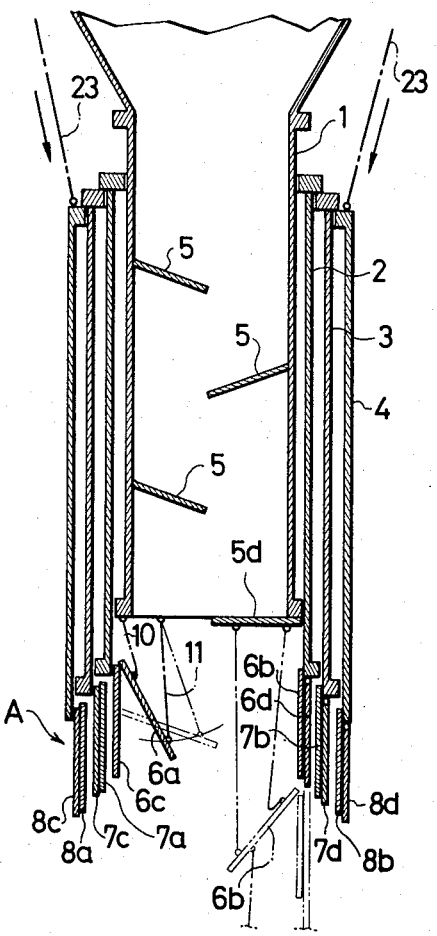

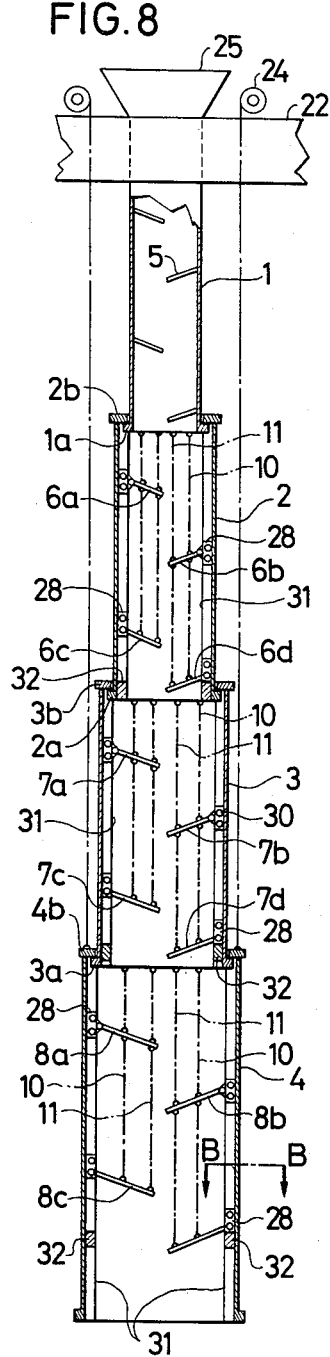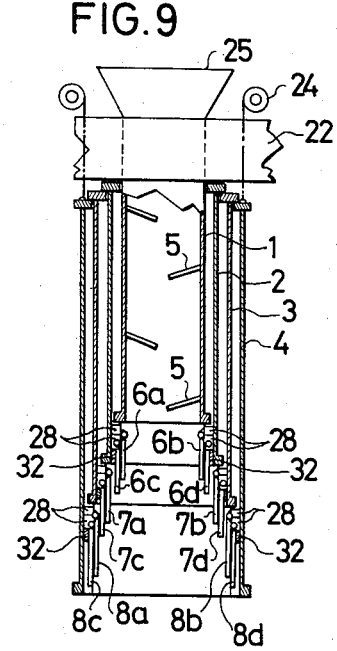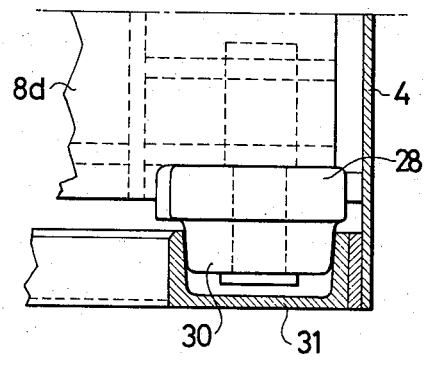

FIG. 11
FIG. 12
FIG. 13
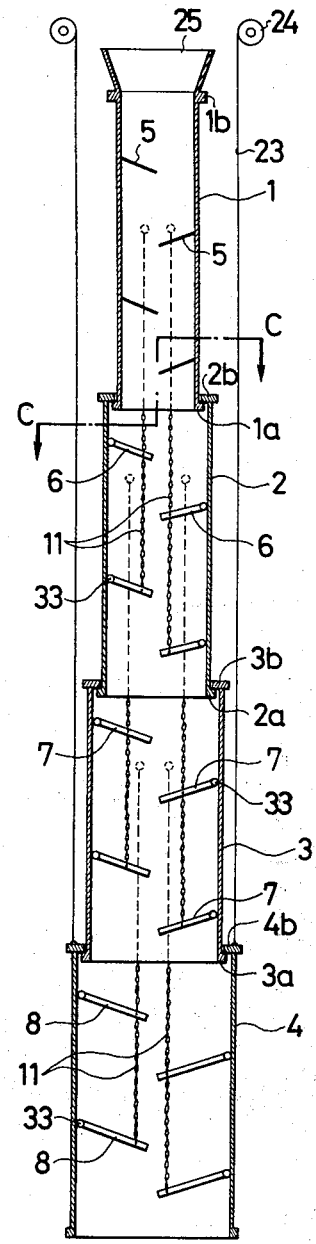
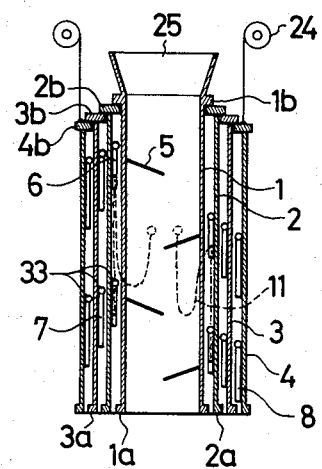
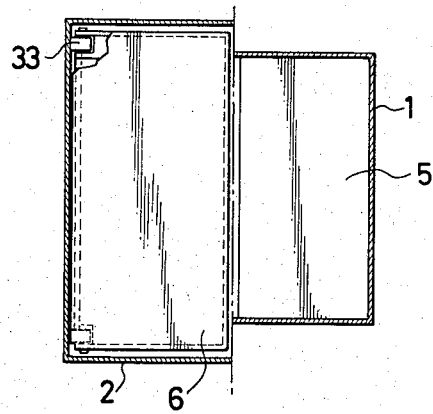

LOADING CHUTE FOR CARGO VESSEL

The present invention relates to a chute for loading granular cargo, such as mineral ore, into a cargo hold.

A ladder chute has been used for loading the granular cargo into the hold of the cargo vessel from a loading machine. The ladder chute of the type which is mounted on the loading machine or movably provided on the deck so as to be transfered from one hold to other holds must be constructed to be raised according to level of the loaded cargo in the hold so as not to be buried by the cargo.

The object of the present invention, therefore, is to provide a cargo loading ladder chute which may be telescopically extended and retracted in order to prevent burying into the stacked cargo. Another object of the present invention is to provide a ladder chute of which trays may be easily folded and projected when the chute is extended and retracted.

In accordance with the present invention, the loading chute comprises a telescopical duct which comprises a plurality of unit ducts of successively enlarged horizontal cross sections, the uppermost duct is provided with trays which are fixed in the duct so as to form a zigzag ladder structure therein, each of second and other lower ducts is respectively provided with trays which are suspended by rope means from the adjacent upper duct so as to form a zigzag ladder structure, whereby when ducts are telescopically retracted, trays are rotated to the vertical position.

The present invention will be further apparent from the following description with reference to the accompanying drawings, in which, FIG. 1 is a schematic cross sectional view of a loading chute according to the present invention;

FIG. 4 is an enlarged partial view of FIG. 1;

FIG. 5 is an enlarged cross sectional view of a state in which the second and lower ducts are slightly extended from the retracted state;

FIG. 8 is a schematic cross-sectional view of another embodiment;

FIG. 9 is a cross sectional view of the retracted state;

FIG. 10 is a sectional view along the line B — B in FIG. 8;

FIG. 11 is a cross sectional view of further embodiment;

FIG. 12 is a cross sectional of the retracted state; and

FIG. 13 is a sectional view along the line C — C in FIG. 11.

Figure 1:
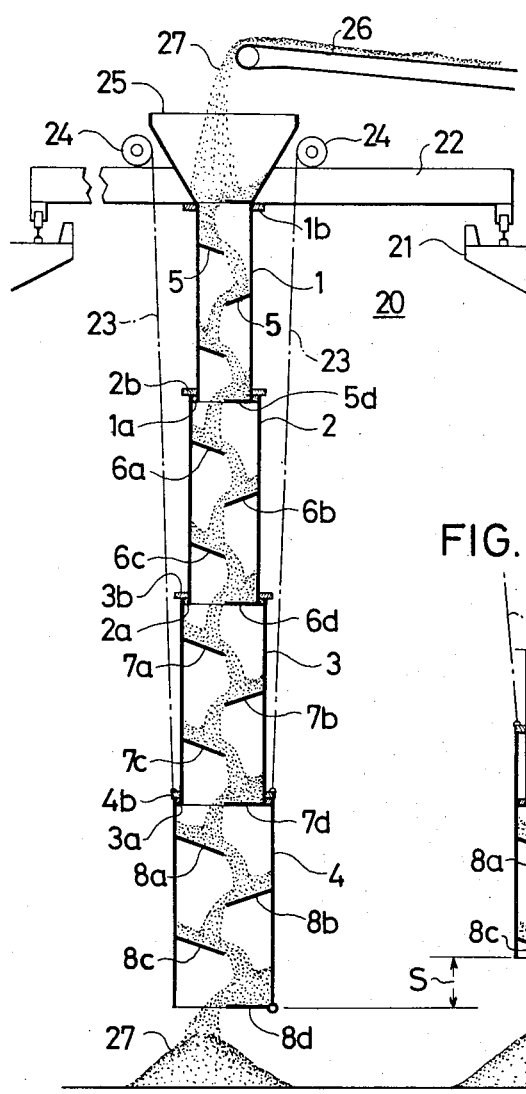

Referring to the drawings and particularly to FIGS. 1 to 6, the chute in accordance with the present invention comprises telescopically constructed duct which comprises a plurality of unit ducts. In FIG. 1, numerals 1 to 4 designate the unit ducts respectively. Each unit duct has a square cross section and lower unit duct is larger in section than upper one. Flanges 1a to 3a provided at the lower end of respective unit ducts 1 to 3 engage with flanges 2b to 4b respectively which are provided at the upper end of ducts 2 to 4, whereby removing of each duct is prevented. Also the flanges 2b to 4b are engaged with each other when the lower duct 4 is raised. The flange 1b of the upper most duct 1 is to prevent removing of the duct.

Figure 6:
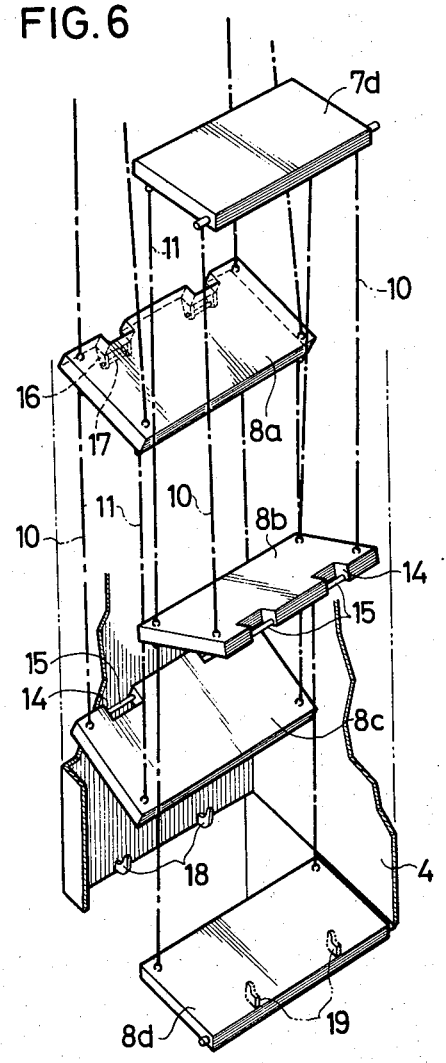
FIG. 6 is a partial perspective view of the loading chute.
Figure 7:
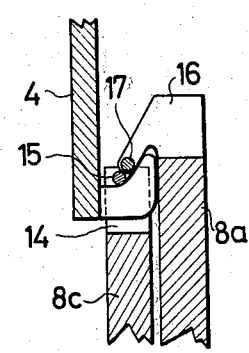
FIG. 7 is an enlarged cross-sectional view of the part A in FIG. 5.

In the upper most duct 1, downwardly sloped trays 5 are provided in stagger relation at equal distances. Each of trays 6a, 7a and 8a of unit ducts 2, 3 and 4 is suspended from the upper unit duct by chain or wire ropes 10 and 11. Each of trays 6b, 7b and 8b is suspended from the corresponding lower most tray 5d, 6d or 7d by wire ropes 10 and 11. The tray 5d is secured to the lower end of the duct 1. Each of the trays 6d, 7d and 8d is pivoted by the pin 12 and held in the horizontal position by the wire rope 13. Each of trays 6c, 7c and 8c is suspended from the upper tray by wire ropes 10 and 11. Further, as shown in FIG. 6, the trays 6b, 6c, 7b, 7c, 8b and 8c are respectively provided, at the rear side thereof, with a recess 14 with an engaging pin 15 therein, while the upper trays 6a, 7a and 8a are respectively provided, at the rear side thereof, with a pair of downwardly projected support members 16 with an engaging pin 17 therein. The second and lower ducts 2 to 4 are respectively provided, at the lower end thereof, with hooks 18 and 19 to receive said pins 15 and 17. Thus, when the chute is retracted from the lowermost duct 4, the hooks 18 engage with the engaging pins 15 of the tray 8c and hooks 19 engage with the engaging pins 15 of the tray 8b, and then the hooks 18 engage with the engaging pins 17 of the tray 8a, thereby pushing upwards the rear portion of each tray so that each tray is suspended in the vertical positon as shown in FIG. 5. Trays of other ducts are similarly folded successively. In the folded position, the trays of each side are superimposed within the wall thickness of the adjacent upper unit duct as shown in FIG. 5. The cargo loading chute of the present invention of the structure as explained above is provided, at the upper portion of the uppermost duct 1, on the trolley 22 which is travelled over the hatch 21 of the ship hold 20. Wire ropes 23 connected to the flange 4b of the lowermost duct 4 are wound on the drums 24 provided on the trolley 22. Further shown in FIG. 1 are a hopper 25 secured to the upper end of the duct 1 and a loading machine 26.

In operation of extending of the chute in FIG. 5, when the wire ropes 23 are released, the second and lower unit chutes 2 to 4 descend by the weight thereof with respect to the upper most duct 1. As the chutes are lowered, firstly the tray 6a is rotated by the descending of engaging pins 17, so that the tray is projected as shown by dotted line in FIG. 5. Further descending of the ducts causes the restoration of the second and third trays 6b and 6c in the similar manner, and further the bottom tray 6d returns to the unfolded position by the rotation around the hinge 12 when the wire ropes 13 are tensioned. The trays in the third and fourth ducts 3 and 4 are also successively projected accordingly as the ducts are lowered. Since the projection of the trays is performed from the tray of the uppermost duct successively, the fall head of the granular cargo from upper tray to lower tray is maintained at a constant height. Thus the extension of the chute can be performed during the loading operation of granular cargo 27. In this case the projection of trays can be realized quite smoothly since the movement of trays is facilitated by the falling force of the granular cargo 27. Thus the chute may be completely extended as shown in FIG. 1.

Figure 2:
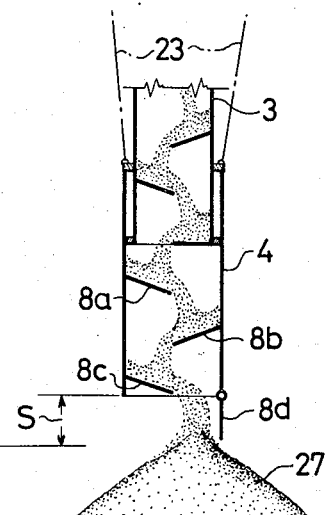
FIG. 2 is a schematic cross sectional view of the lowermost unit duct.
Figure 3:
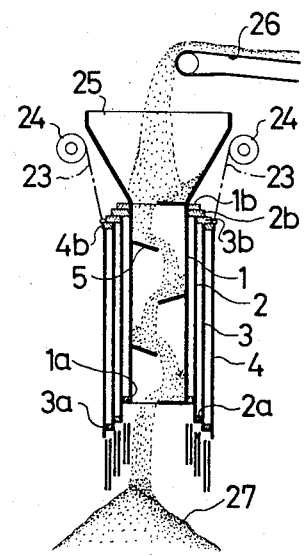
FIG. 3 is a schematic cross sectional view of the loading chute in completely retracted state.

In FIG. 1, the granular cargo 27 charged into the hopper 25 makes a zigzag fall by means of trays and is stacked in the hold 20. When the stack height of the granular cargo 27, which can be detected by means of an already known detecting means not shown in the drawing, reaches a predetermined level, the wire ropes 23 are wound up automatically or manually by means of the drum 24 to raise the lowermost duct 8 a distance of one step S, that is the level of adjacent upper tray position c as shown in FIG. 2. At this time the bottom tray 8d is rotated to the vertical position by loosening of wire ropes 13, thus the granular cargo stacked on the tray 8d is dropped. Further the duct 4 is raised the one-step distance S when the granular cargo 27 is further stacked in the hold 20, thereby the hooks 18 at the lower extremity of the duct 4 raises the engaging pins 15 of the tray 8c, thus the tray is rotated to the vertical position. As the granular cargo 27 is further heaped in the hold 20, the duct 4 is raised stepwise by the one-step distance and the engaging hooks 18 and 19 push upwards the engaging pins 15 and 17 of the trays 8b and 8a thereby moving the trays to vertical position. The trays 8d, 8b; and 8c, 8a are superposed within the wall thickness of the upper duct 3, and do not therefore interfere with the fall of granular cargo. The upper ducts 3 and 2 are also retracted according to the stack height of the granular cargo 27 with the stepwise folding of trays from the bottom, and the chute is finally retracted as shown in FIG. 3 when the loading is completed.

FIGS. 8 to 10 show another embodiment of the present invention. In this embodiment the trays 6a – 6d, 7a – 7d and 8a – 8d are rotatably provided on slide blocks 28 respectively. Each slide block has guide rollers 30 at the outside thereof which engage with the rails 31 provided in the duct as shown in FIG. 10. Further, the pivoting points of the upper tray 8a is located more inside than that of the lower tray 8c so that the trays can be superposed in the vertical folded position thereof. Further, each rail 31 is provided, at the lower end thereof, with engaging member 32 which engages with the slide block 28 to move the block upwards thereby causing the pivoting of tray by means of the loosening of wire ropes 10 and 11. Other parts are constructed as explained in the foregoing example and same numeral as that of previous one is used to show the similar part to previous one.

FIGS. 11 to 13 show a further embodiment of the present invention. In this embodiment trays 6, 7 and 8 are pivotally provided by pins 33 on the ducts 2, 3 and 4 respectively and suspended by wire ropes 11 from the upper duct. When the chute is retracted, trays are folded taken in the space between the upper and lower ducts as shown in FIG. 12. When the chute is extended, each tray is rotated about the pin 33 to project. Loading operation of this embodiment is same as that of above described embodiment.

The advantages of the cargo loading chute of the present invention are as follows:

1. The telescopical structure of the chute enables, when mounted on the loading machine or in the ship hold, to maintain the fall head of the cargo constant in response to the variation of the draft of ship or of the stack height of the granular cargo, and thus to prevent the burying of chute into the stacked cargo;
2. Since the trays are folded successively from the bottom and projected from the top respectively when the chute is retracted or extended, the fall of cargo always takes a zigzag course of constant pitch, which minimizes each fall height of cargo and is therefore extremely effective for reducing pulverization of granular cargo;
3. The folding and projection of trays are carried out by the retraction and extention of the chute and do not require particular power source for pivoting the trays.

What is claimed is:
1. A loading chute for cargo vessel comprising a telescopically constructed duct which comprises a plurality of unit ducts of successively enlarged horizontal cross sections, the uppermost unit duct being provided with trays which are fixed in said unit duct so as to form a zigzag ladder structure therein, each of the second and other lower unit ducts being respectively provided with trays which are suspended by rope means from the adjacent upper unit duct so as to form a zigzag ladder structure, and each of the second and other lower unit ducts being respectively provided with engaging means at the lower end thereof so that, when a unit duct is retracted over the adjacent upper unit duct, said engaging means engage with the rear portion of each tray located above said engaging means thereby moving said tray in a downward folded position.

2. A loading chute for cargo vessel in accordance with claim 1 wherein rear side of each tray of the second and other lower unit ducts is pivoted to a slide block which is slidably provided in the unit duct.

3. A loading chute for cargo vessel comprising a telescopically constructed duct which comprises a plurality of unit ducts of successively enlarged horizontal cross sections, the uppermost unit duct being provided with trays which are fixed in said unit duct so as to form a zigzag ladder structure therein, each of the second and other lower unit ducts being respectively provided with trays which are vertically rotatably mounted at the rear portions thereof on the inner wall of the unit duct so as to form a zigzag ladder structure, the front portion of each tray being suspended by rope means from the adjacent upper unit duct, and each tray being adapted to be suspended vertically by the loosening of said rope means and taken in the space between the adjacent upper and lower unit ducts when the second and other lower unit ducts are retracted.

* * * * *